ð US011054825B2

United States Patent
Steiner et al.

(10) Patent No.: US 11,054,825 B2
(45) Date of Patent: *Jul. 6, 2021

(54) METHOD AND FAULT TOLERANT COMPUTER ARCHITECTURE FOR REDUCING FALSE NEGATIVES IN FAIL-SAFE TRAJECTORY PLANNING FOR A MOVING ENTITY

(71) Applicant: TTTECH AUTO AG, Vienna (AT)

(72) Inventors: Wilfried Steiner, Vienna (AT);
Hermann Kopetz, Baden (AT);
Mehmed Ayhan, Vienna (AT);
Günther Bauer, Vienna (AT)

(73) Assignee: TTTECH AUTO AG, Vienna (AT)

( * ) Notice: Subject to any disclaimer, the term of this patent is extended or adjusted under 35 U.S.C. 154(b) by 225 days.

This patent is subject to a terminal disclaimer.

(21) Appl. No.: 16/016,783

(22) Filed: Jun. 25, 2018

(65) Prior Publication Data
US 2018/0373252 A1 Dec. 27, 2018

(30) Foreign Application Priority Data
Jun. 27, 2017 (EP) ................................. 17178118

(51) Int. Cl.
| | |
|---|---|
| *G08G 1/16* | (2006.01) |
| *G05D 1/00* | (2006.01) |
| *G06F 11/16* | (2006.01) |
| *G05D 1/02* | (2020.01) |

(52) U.S. Cl.
CPC .......... *G05D 1/0077* (2013.01); *G05D 1/0055* (2013.01); *G05D 1/0088* (2013.01);
(Continued)

(58) Field of Classification Search
CPC ...... G05D 1/0088; G05D 1/0055; G05D 1/02; G05D 1/0238; G05D 1/0246;
(Continued)

(56) References Cited

U.S. PATENT DOCUMENTS

| | | | |
|---|---|---|---|
| 9,787,494 B2 | 10/2017 | Steiner et al. | |
| 2004/0047518 A1* | 3/2004 | Tiana ........................ | G06T 5/50 382/284 |

(Continued)

FOREIGN PATENT DOCUMENTS

EP  3166246 A1  5/2017

OTHER PUBLICATIONS

European Search Report issued in Application No. 17178118.0, completed Dec. 7, 2017 (2 pages).
(Continued)

*Primary Examiner* — Dalena Tran
(74) *Attorney, Agent, or Firm* — Eversheds Sutherland (US) LLP (57) ABSTRACT

A method and a fault-tolerant computer architecture (FCTA) for fail-safe trajectory planning for a moving entity (MOV). The method and FCTA uses a commander (COM), a monitor (MON), and a safe envelope generating stage (ENV). Based on sensor input, the commander (COM) and the monitor (MON) produce real-time images of objects (OBJ1, OBJ2) detected. A trajectory planning stage (TRJ-PLN) generates trajectories (COM-TRJ1, COM-TRJ2), and the safe envelope generating stage (ENV) generates a safety envelope. The commander (COM) provides the one or more trajectories (COM-TRJ1, COM-TRJ2) to the monitor (MON) and the decision subsystem (DECIDE). A trajectory verification stage (TRJ-VRFY) verifies a trajectory (COM-TRJ1, COM-TRJ2) generated by the commander (COM) only if said trajectory (COM-TRJ1, COM-TRJ2) is completely located inside said safety envelope. A moving entity (MOV) uses a trajectory (COM-TRJ1, COM-TRJ2) generated by the commander (COM) only when said trajectory is verified by the monitor (MON).

13 Claims, 9 Drawing Sheets

(52) U.S. Cl.
CPC ............. *G05D 1/02* (2013.01); *G05D 1/0274* (2013.01); *G06F 11/16* (2013.01); *G06F 11/1637* (2013.01)

(58) Field of Classification Search
CPC .. B60W 30/08; B60W 2420/42; B60W 30/52; B60W 2554/00; B60W 30/09; B60W 30/095
USPC ............................................ 701/23; 382/284
See application file for complete search history.

(56) References Cited

U.S. PATENT DOCUMENTS

| | | |
|---|---|---|
| 2015/0012166 A1 | 1/2015 | Hauler et al. |
| 2016/0104382 A1* | 4/2016 | Besada Portas ..... G08G 5/0039 701/540 |
| 2016/0147224 A1* | 5/2016 | Roger ................... G08G 5/0047 701/3 |
| 2016/0180715 A1* | 6/2016 | Burke .................. G08G 5/0013 701/467 |
| 2017/0148331 A1 | 5/2017 | Raynaud et al. |
| 2018/0151072 A1* | 5/2018 | Altinger ................... G08G 1/04 |
| 2019/0291727 A1* | 9/2019 | Shalev-Shwartz ..... G08G 1/163 |

OTHER PUBLICATIONS

"Sensor fusion", Jun. 10, 2017 (Jun. 10, 2017), XP055433089, Retrieved from the Internet: URL:https://en.wikipedia.org/w/index.php?title=Sensor fusion&oldid=784923492 [retrieved on Dec. 7, 2017], 4 pages.

\* cited by examiner

FIG. 1 (State-of-the-art)

FIG. 2 (State-of-the-art)

FIG. 3 (State-of-the-art)

FIG. 4 (State-of-the-art)

FIG. 5

FIG. 6 (State-of-the-art)

METHOD AND FAULT TOLERANT COMPUTER ARCHITECTURE FOR REDUCING FALSE NEGATIVES IN FAIL-SAFE TRAJECTORY PLANNING FOR A MOVING ENTITY

CROSS-REFERENCE TO RELATED APPLICATIONS

The disclosure claims priority to and the benefit of European application No. 17178118.0, filed Jun. 27, 2017, which is hereby incorporated by reference in its entirety.

SUMMARY

The invention relates to a method for reducing false negatives in fail-safe trajectory planning for a moving entity, where the method uses at least three subsystems, wherein a first of said subsystems, the so-called commander, implements at least a sensor fusion stage and a trajectory planning stage, and wherein a second of said subsystems, the so-called monitor implements at least a sensor fusion stage and a safe envelope generating stage and wherein sensors are monitoring the surrounding of the moving entity, and wherein said sensor fusion stages of the commander and the monitor accept raw and/or preprocessed sensor data from the monitoring of said sensors as input, and wherein based on said input the sensor fusion stages of the commander and the monitor produce as output real-time images of objects detected due to the monitoring of the sensors, and wherein the trajectory planning stage of the commander generates one or more trajectories based at least on the output of the sensor fusion stage of the commander, and wherein said safe envelope generating stage of the monitor generates a safety envelope based at least on the output of the sensor fusion stage of the monitor, and wherein a trajectory verification stage of the monitor and/or a trajectory verification stage of a decision subsystem verifies a trajectory generated by the commander if and only if said trajectory is completely located inside said safety envelope generated by the safe envelope generating stage of the monitor, and wherein a moving entity uses a trajectory generated by the commander only when said trajectory is verified by the monitor and/or by the decision subsystem.

Furthermore, the invention relates to a fault tolerant system, in particular fault-tolerant computer system, for fail-safe trajectory planning for a moving entity, wherein the system comprises at least three subsystems, wherein a first of said subsystems, the so-called commander, implements at least a sensor fusion stage and a trajectory planning stage, and wherein a second of said subsystems, the so-called monitor implements at least a sensor fusion stage and a safe envelope generating stage, wherein said sensor fusion stages of the commander and the monitor are configured to accept as input raw and/or preprocessed sensor data from sensors which are monitoring the surrounding of the moving entity, and wherein based on said input the sensor fusion stages of the commander and the monitor are configured to produce as output real-time images of objects detected due to the monitoring of the sensors, and wherein the trajectory planning stage of the commander is configured to generate one or more trajectories based at least on the output of the sensor fusion stage of the commander, and wherein said safe envelope generating stage of said second subsystem is configured to generate a safety envelope based at least on the output of the sensor fusion stage of the monitor, and wherein a trajectory verification stage of the monitor and/or a trajectory verification stage of a decision subsystem is configured to verify a trajectory generated by the commander if and only if said trajectory is completely located inside said safety envelope generated by the safe envelope generating stage of the monitor, and wherein a moving entity uses a trajectory generated by the commander only when said trajectory is verified by the monitor and/or by the decision subsystem.

Finally, the invention relates to an autonomous moving entity comprising at least one fault tolerant system as mentioned above.

The autonomous maneuvering of a moving entity in a three dimensional space, without the continuous interaction of a human, requires the moving entity to implement the ability to recognize its surrounding as well as the ability to plan trajectories along which the moving entity can safely move. We call such a trajectory a safe trajectory. The moving entity implements such functionality by means of a computer-based system (including sensors and actuators). Components of computer-based system may fail, e.g., due to a random hardware failures. As a consequence, if such a failure is not handled appropriately, the faulty computer system may calculate an unsafe trajectory, e.g., a trajectory that would yield a collision of the moving entity with an object along the trajectory. Failures of the computer system can be mitigated by appropriate redundancy and fault-tolerance mechanisms.

It is an object of the invention to disclose a novel method and a system to tolerate failures in a computer system for an autonomously maneuvering moving entity.

This object is achieved with a method and a with a fault tolerant system described in the introduction, wherein the commander implements an information merging stage that takes as information at least parts of the output of the sensor fusion stage of the commander and at least parts of the output of the sensor fusion stage of the monitor and combines said information to generate output, and wherein the trajectory planning stage of the commander uses said generated output of said information merging stage when generating one or more trajectories, wherein the information merging stage uses a set-theoretic superset operation to combine the outputs from the sensor fusion stages to produce output, or in the case that the sensor fusion stages produce a free space as output, the information merging stage uses a set-theoretic cut-set operation to combine the outputs from the sensor fusion stages, or where the commander implements an information agreement stage, the so-called first information agreement stage, wherein said first information agreement stage takes as information at least parts of the raw and/or preprocessed sensor data from sensors and in addition takes information indicating which raw and/or preprocessed sensor data the monitor accepts from the monitoring of said sensors as input in its sensor fusion stage, based on which input the commander and the monitor produce as output real-time images, wherein said first information agreement stage provides at least parts of the raw and/or preprocessed sensor data from sensors and in addition takes information indicating which sensor data the monitor will use in its sensor fusion stage to the trajectory planning stage, and wherein said trajectory planning stage uses said information from said first information agreement stage to add safety margins around the real-time images provided from the sensor fusion stage of the commander, and wherein said trajectory planning stage produces trajectories that do not intersect neither with the real-time images produced by the sensor fusion stage of the commander nor with said safety margins around them.

According to the invention at least three subsystems, a commander, a monitor and a decision subsystem are provided, which, for example, form a computer system. It is assumed that at any point in time either the commander or the monitor or the decide subsystem may fail, but not two or three of said subsystems at the same point in time.

The commander generates a trajectory. The monitor calculates a space for safe trajectories (called a safety envelope). In one realization, the decision subsystem accepts the trajectory from the commander and the safety envelope from the monitor and verifies the trajectory from the commander successfully if and only if the trajectory generated by the commander indeed is inside the safety-envelope calculated by the monitor. The moving entity will only move along a trajectory, if the trajectory is (successfully) verified by the decide subsystem.

In the failure case, the commander may generate unsafe trajectories or the monitor may generate a faulty safety envelope. However, the decide subsystem is designed in such a way that even in the failure case it is guaranteed that the decide subsystem will only verify a commander trajectory (that is a trajectory generated by the commander) if and only if said commander trajectory is inside the safety envelope generated/calculated by the monitor. This failure mode of the decide subsystem may be achieved, for example, by constructing the decide subsystem as a simple component according to well established engineering processes and standards, for example by designing the decide subsystem as an ASIL D component according to the ISO 26262 standard or as a simple device according the DO 178c and DO 254 standards. Alternatively, the decide subsystem itself could be implemented as a self-checking pair. Examples of self-checking pair realizations are described in EP 3 166 246 A1 and WO 2015/058224 A1.

Since either the commander, monitor, or decide subsystem may fail, but not any two or three subsystems fail at the same point in time, the decide subsystem will never successfully verify an unsafe commander trajectory and, thus, the moving entity will not move along an unsafe commander trajectory.

In another realization, the monitor may receive the trajectory from the commander and may implement a verification function (rather than the decide subsystem). In this case, the monitor informs the decide subsystem whether it successfully verified the commander trajectory or not. This implementation is beneficial to keep the decide subsystem even more simple, which helps in arguing its failure behavior as outlined above.

Since it is preferable that the hardware of the commander and monitor is not identical and/or commander and monitor will not use identical input and/or will implement different software routines, and/or will differ from each other in any other way, there is a non-zero probability that the commander will generate a trajectory that, indeed, is safe, but that the monitor generates a safety envelop that does correspond to the commander trajectory. Such a safe trajectory calculated by the commander, but not successfully verified by the monitor (or the decide subsystem) is called a false negative.

False negatives are problematic, since the computer system cannot distinguish between false negatives and a failure of the commander. In an example realization, a false negative could cause the moving entity to enter an emergency state or to switch over to a further redundant backup, although no failure has occurred. Thus, minimizing the probability of the occurrence of false negatives is essential to avoid such situations.

The invention reduces the probability of the occurrence of false negatives by the monitor providing information to the commander for trajectory planning. This additional information can be one or many of the following:

- information from the monitor that characterizes the safety envelope,
- online exchange of information regarding the sensor inputs of commander and monitor,
- offline calculated parameters that describe the maximum differences of commander trajectories and monitor safety envelop calculations.

The commander merges the information from the monitor with its own perception of the environment in a safe way. Generally speaking, the information of the monitor represents information about the free space surrounding the moving entity as perceived by the monitor. The commander itself also has a perception of said free space. The information merging in the commander is done in a way that the commander plans the trajectories such that the trajectories will only be in the free space as perceived by the commander as well as the free space as perceived by the monitor. Examples for this merging process are the set-theoretic cut set of the free spaces as perceived by commander and monitor and the set-theoretic super-set of objects as perceived by the commander and the monitor.

Advantageous embodiments of the methods described above and of the fault tolerant system are detailed hereinafter:

- the monitor may implement an information agreement stage, the so-called second information agreement stage;
- the information indicating which sensor data the monitor will use in its sensor fusion stage may be provided by the second information agreement stage;
- the trajectory planning stage may use information of which algorithms are deployed in the stages different stages sensor fusion, safe envelope generating stage, and trajectory verification of the monitor to add safety margins around the real-time images provided from the sensor fusion stage of the commander;
- the known characteristics of the monitor may comprise or consist of algorithms deployed in the sensor fusion stage, and/or the safe envelope generating stage, and/or the trajectory verification stage;
- a fallback subsystem may be provided, wherein said fallback subsystem implements at least a sensor fusion stage and trajectory planning stage, so that the fallback subsystem is capable of generating trajectories, and wherein—when a trajectory generated by the commander is not verified by the decision stage—a trajectory or trajectories produced by the fallback subsystem are provided for being used by the moving entity;
- an information distribution may be provided, via which a trajectory or trajectories generated by the commander is/are communicated to the monitor and the decision subsystem;
- said the information distribution may implements mechanism that prevent inconsistent message distribution between the monitor and the decision subsystem, such as cryptographically signatures, and/or checksums, and/or mechanisms alike;
- the trajectory verification stage in the monitor may also provide the trajectories generated by the commander and received by the monitor to the decision subsystem, and the decision subsystem uses the trajectories generated by the commander only if the trajectories received directly from the commander equal the trajectories received from the monitor.

BRIEF DESCRIPTION OF THE DRAWINGS

In the following, in order to further demonstrate the present invention, illustrative and non-restrictive embodiments are discussed, as shown in the drawings, which show.

DETAILED DESCRIPTION

We discuss some of the many implementations of the invention next. If not stated otherwise, all details described in connection with a specific example are not only valid in connection with this example, but apply to the general scope of protection of the invention.

Figure 1:
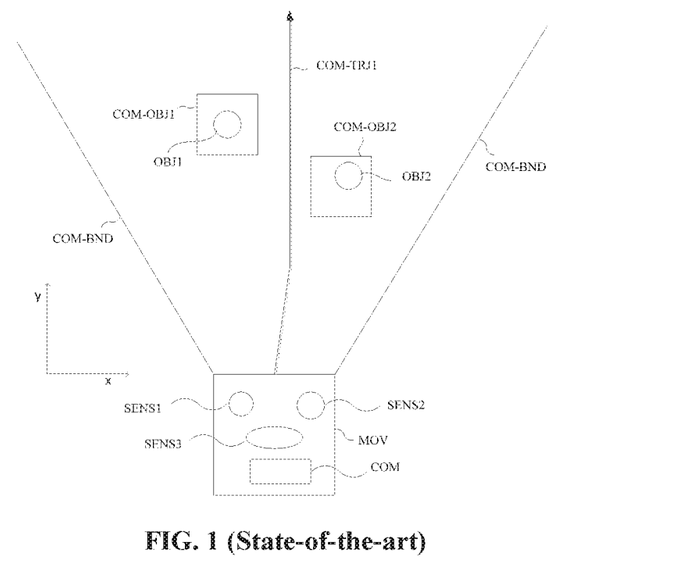
FIG. 1 an example of trajectory planning according to the state-of-the-art.

FIG. 1 depicts the current state-of-the-art in trajectory planning for moving entities MOV. A moving entity MOV is equipped with various sensors SENS1, SENS2, SENS3. These sensors enable MOV to detect objects OBJ1, OBJ2 in the surrounding of the moving entity MOV. Since sensors are not perfect, the moving entity MOV is not able to exactly calculate location, size, and velocity (and other parameters, which may be necessary) of the objects OBJ1, OBJ2. The moving entity MOV can only approximate the location, size (and other parameters as necessary) of the objects OBJ1, OBJ2. These approximation of an object OBJ1, OBJ2 is represented by the so-called real-time image COM-OBJ1, COM-OBJ2, respectively. The real-time images COM-OBJ1, COM-OBJ2 of objects OBJ1, OBJ2 are used by MOV as an input to calculate a safe trajectory COM-TRJ1. Other inputs for trajectory calculation may be for example a pre-configured destination, localization information (e.g., Global Positioning System—GPS), map information, and/or information regarding the internal state of the moving object MOV, such as velocity, acceleration, vehicle dynamics, metrics, etc.

Figure 2:
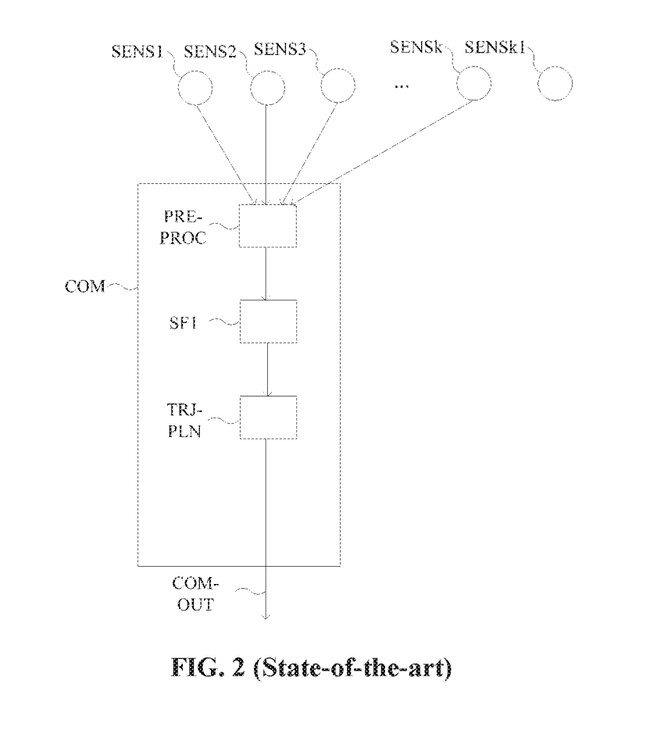
FIG. 2 an example of a commander subsystem according to the state-of-the-art.

FIG. 2 depicts an example of a subsystem COM, the so-called "commander". The commander COM comprises software processes and hardware processes to generate a trajectory (or trajectories). Sensors SENS1, SENS2, SENS3, SENSk, SENSk1 are measuring the physical parameters of an environment, in which the moving entity MOV is located. Examples of such sensors are mono and stereo cameras, ultra-sonic sensors, Light Detection and Ranging (LIDAR) sensors, radar, etc. The data measured by the sensors may optionally be pre-processed in a pre-process stage PRE-PROC. The output of said optional pre-process stage PRE-PROC and/or of raw sensor data is provided as input to a sensor-fusion stage SF1 of the commander, which sensor-fusion stage SF1 fuses the sensor information and provides, as an output, a perception of the environment which is surrounding the moving entity MOV.

In this context it should be noted that usually the moving entity MOV is moving with a velocity >0. However, the moving entity MOV may also be in a state with zero velocity or zero velocity and zero acceleration. In this case, the sensors may also measure data as described above, which data is being used for generate a perception of the environment also in said state of zero velocity.

In particular this perception of the environment surrounding the moving entity MOV may include information, for example information of location, size, and movement of objects OBJ1, OBJ2, for example in form of real-time images COM-OBJ1, COM-OBJ2, and/or information of the boundaries of sensor measurements, for example boundaries COM-BND as shown in FIG. 1, and/or general information regarding free space in the environment surrounding the moving entity MOV, which is known to be not occupied by any objects.

Furthermore, the commander COM comprises a trajectory planning stage TRJ-PLN. The output of the sensor fusion stage SF1 is used as input by the trajectory planning stage IRJ-PLN. It may be provided, that in addition to said output of the sensor fusion stage SF1 many other inputs are used for the trajectory planning stage TRJ-PLN, too. Other inputs to the trajectory planning stage TRJ-PLN may be pre-configured destination, localization information (e.g., according to a Global Positioning System—"GPS"), map information, and/or information regarding the internal state of the moving entity MOV, such as velocity, acceleration, stability metrics, etc. of the moving entity MOV. As an output, the trajectory planning stage TRJ-PLN produces one or more trajectories.

Figure 3:
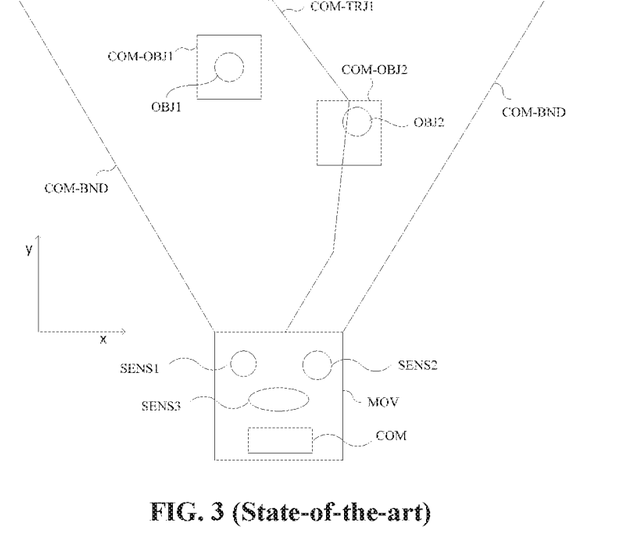
FIG. 3 an example of a trajectory produced by a faulty commander subsystem according to the state-of-the-art, FIG. 4 an example of a fault-tolerant computer architecture comprising commander, monitor, and decide subsystems according to the state-of-the-art, FIG. 5 an example of commander, monitor, and decide subsystems, FIG. 6 an example of trajectory planning according to the state-of-the-art, FIG. 7 an example of trajectory planning, FIG. 8 an example of commander, monitor, and decide subsystems, FIG. 9 an example of commander, monitor, and decide subsystems, FIG. 10 an example of trajectory planning, FIG. 11 an example of commander, monitor, and decide subsystems, FIG. 12 an example of trajectory planning, FIG. 13 an example commander, monitor, decide, and fallback subsystems, FIG. 14 an example of trajectory planning, and FIG. 15 an example of commander, monitor, and decide subsystems and a network connecting sensors with said subsystems.

FIG. 3 depicts an unsafe trajectory as computed by the commander subsystem COM as a result of an internal failure of the commander subsystem COM. As depicted the trajectory COM-TRJ1 intersects in this example with the real-time image COM-OBJ2, and if the moving entity MOV was to move along this unsafe trajectory COM-TRJ1, the moving entity MOV would collide with object OBJ2.

It is the aim of this invention to prevent such scenarios, while significantly reducing the probability of fail-negatives.

Figure 4:
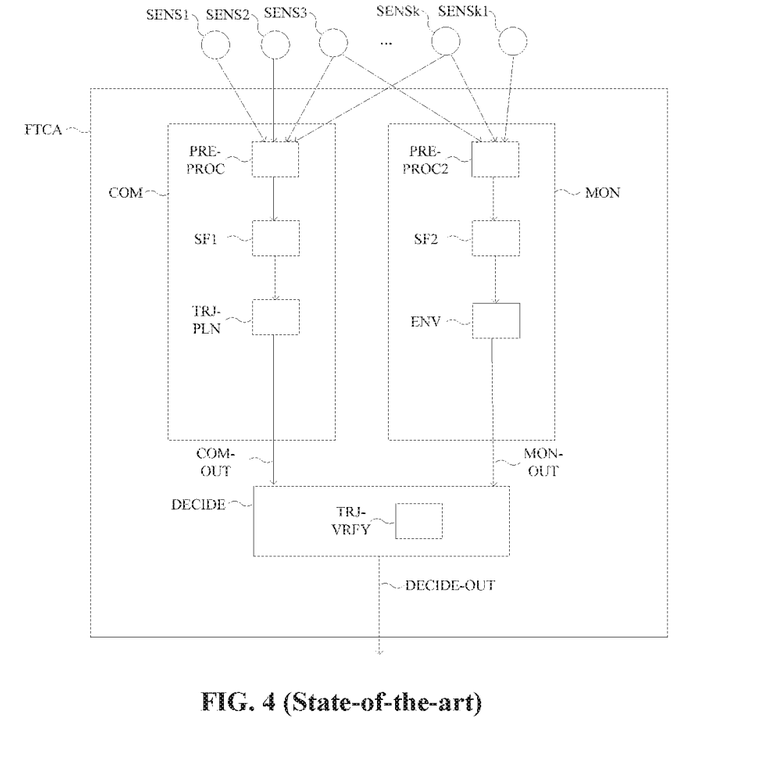

FIG. 4 depicts the state-of-the-art in fail-safe trajectory planning for moving entities MOV. In this example the computer-based system FTCA used for trajectory planning comprises a commander subsystem COM discussed in FIG. 2, an additional monitor subsystem MON, the so-called "monitor", and a decision subsystem DECIDE, which in the following will also be called "decide subsystem".

According to the state-of the art as well as according to the invention in general, the subsystems commander COM, monitor MON and decision subsystem DECIDE form a Fault-Tolerant Computer Architecture ("FTCA").

The monitor MON takes sensor data as input—in this example from sensors SENS3, SENSk, and SENSk1, the commander COM takes data from the sensors SES1, SENS2, SENS3 as input. In general, the assignment of which sensors are used by the commander COM and the monitor MON is defined at design time of the computer-based system and may even change during operation of the moving object. In one extreme case commander COM and monitor MON would use the same sensor data. In another extreme case commander COM and monitor MON would use disjoint sets of sensor data. In another case monitor MON would use a subset of the sensors that commander COM uses. In this case, monitor MON can optionally preprocess its sensor data in a preprocessing stage PRE-PROC2, which is being comprised by the monitor MON as depicted in FIG. 4.

The output of the optional PRE-PROC2, as depicted in FIG. 4, and/or raw sensor data is provided to a sensor-fusion stage SF2 of the monitor MON. The sensor fusion stage SF2 produces a perception of the environment surrounding the moving entity MOV. In particular, this perception may include information of location, size, and movements (and other parameters as necessary) of objects OBJ1, OBJ2, for example in form of real-time images MON-OBJ1, MON-OBJ2, the boundaries of sensor measurements, for example the boundaries MON-BND in FIG. 6, and/or general information regarding the free space in the environment surrounding the moving entity MOV.

Additionally, the monitor MON comprises a safe envelope generating stage ENV. The output of the sensor fusion stage SF2 is used as an input by said safe envelope generation stage ENV to generate a safety envelope (also denoted as "safe envelope" or "envelop"). Other potential inputs to the safe envelope generation stage ENV to generate a safety envelope may be pre-configured destination, localization information (e.g., Global Positioning System—GPS), map information, and/or information regarding the internal state of the moving entity MOV, such as velocity, acceleration, stability metrics, etc. of the moving entity.

The safety envelope is a space for safe trajectories, i.e., all trajectories inside said safety envelop are safe trajectories.

The commander of the computer system as shown in FIG. 4 works as already described in connection with FIG. 2.

As described above, a decision subsystem DECIDE is provided in addition, which decision subsystem DECIDE implements a trajectory verification stage TRJ-VRFY which receives trajectories from the commander COM, for example by using an interface COM-OUT, and receives corresponding safety envelops from the monitor MON, for example by using an interface MON-OUT. The trajectory verification stage TRJ-VRFY checks whether a trajectory from the commander subsystem COM lies inside of the safety envelope generated by the monitor subsystem MON. If the trajectory from commander COM is, indeed, inside the safety envelop from the monitor MON, the decision subsystem DECIDE decides that the trajectory is said to be successfully verified by the trajectory verification stage TRJ-VRFY. The decision subsystem DECIDE will then provide such a successfully verified trajectory generates by the commander COM to a further use by the moving entity MOV, for example using an interface DECIDE-OUT. The moving entity MOV will execute control on its actuators to cause movement along said trajectory accordingly.

Figure 5:
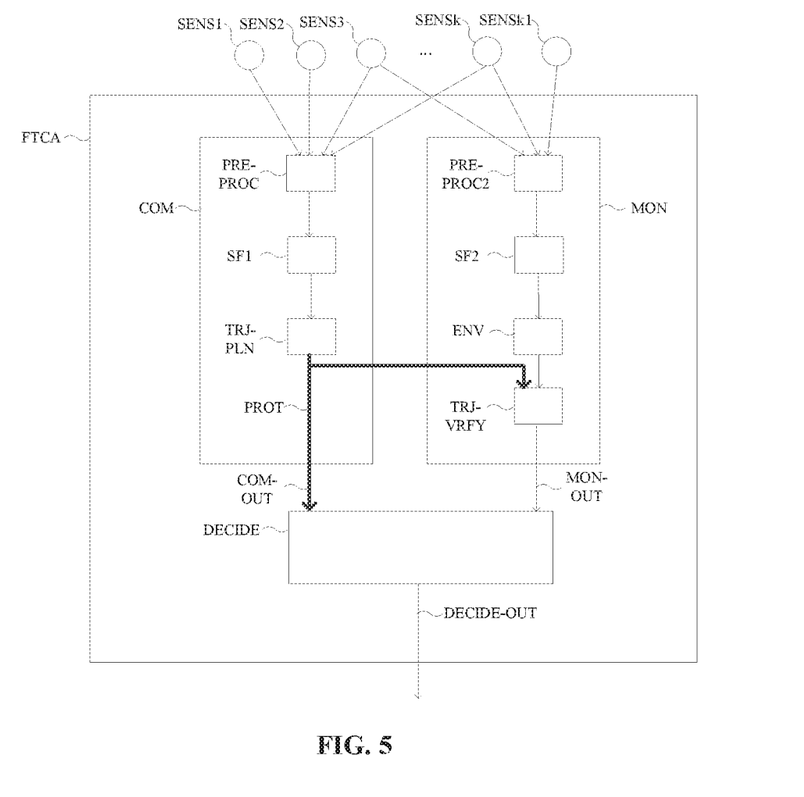

FIG. 5 depicts fail-safe trajectory planning for moving entities MOV that implements the trajectory verification stage in the monitor subsystem MON, rather than in (or in addition to) the decision subsystem DECIDE. The implementation in the monitor MON may be beneficial as the monitor MON may implement more and/or more capable computation resources (e.g., memory, CPU cores, GPUs etc.) than the decision subsystem DECIDE. In general, and this aspect is not being restricted to the specific example shown in the figure, a decision subsystem DECIDE may be realized as a simple component following rigorous design principles, for example as defined as ASIL D components according to the ISO 26262 standard. Moving complexity from the decision subsystem DECIDE to the monitor subsystem MON allows, thus, to design the decision subsystem DECIDE even more simple. The monitor subsystem MON will then inform the decision subsystem DECIDE whether it successfully verified the trajectory from COM, or not, using the interface MON-OUT, and the decision subsystem DECIDE will decide if a trajectory generated by the commander COM may be used by the moving entity MOV or not. Since the decision subsystem DECIDE uses output of the commander COM and the monitor MON, it can handle the case where the commander COM or the monitor MON exhibit a failure.

In this approach a potential inconsistency in the information distribution PROT from the trajectory planning stage TRJ-PLN in the commander COM to the trajectory verification stage TRJ-VRFY in the MON and to the decide subsystem DECIDE may occur, in that it may be possible that in the failure case of the commander subsystem COM, a failure in the information distribution PROT causes that the trajectory verification stage TRJ-VRFY and the decide subsystem DECIDE receive different trajectories.

To overcome this limitation it may be provided that the information distribution PROT implements well-known concepts. For example, the output of the trajectory planning stage TRJ-PLN could be signed cryptographically or by means of a checksum and the trajectory verification stage TRJ-VRFY stage as well as the decide subsystem DECIDE accept the trajectory only if the signature and/or checksum is correct.

Alternatively, the trajectory verification stage TRJ-VRFY stage can provide not only the information of successful verification of a commander trajectory to the decide stage DECIDE, but may also provide the commander trajectory itself to the decide subsystem DECIDE. Thus, the decide stage DECIDE would only forward the trajectory on its interface DECIDE-OUT, if it received the same trajectory from the commander COM as well as from the monitor MON over the interfaces COM-OUT, MON-OUT, respectively. "Commander trajectory" means a trajectory generated by the commander.

For the sake of simplicity, in the further description of the many possible realizations we will assume that the trajectory verification stage TRJ-VRFY is implemented in the monitor subsystem MON. Realizations that implement the trajectory verification stage TRJ-VRFY in the decide subsystem DECIDE can be easily derived by following the examples in FIG. 4 and FIG. 5, and the following description applies similarly to an arrangement in which the trajectory verification stage TRJ-VRFY is implemented in the decide subsystem DECIDE.

Figure 6:
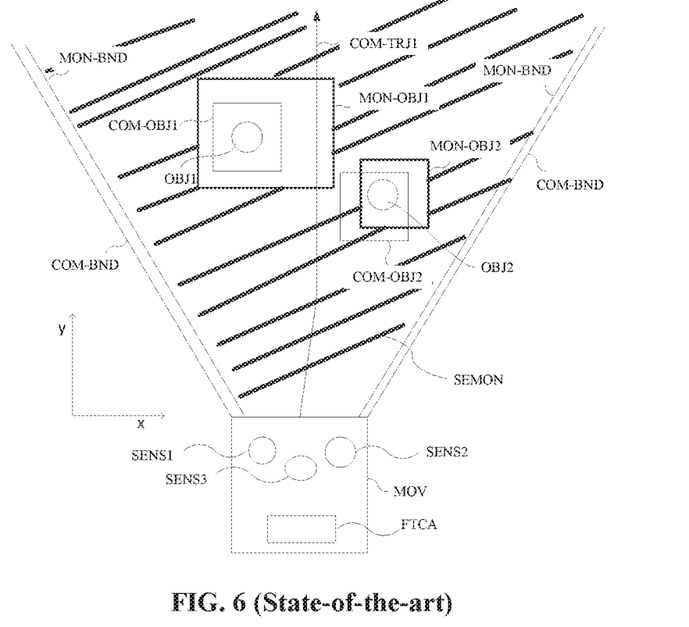

FIG. 6 depicts a scenario similar to the one in FIG. 1. According to FIG. 6, a moving entity MOV implements a fail-safe trajectory planning as described in FIG. 5. Thus, FIG. 6 depicts not only the real-time images COM-OBJ1, COM-OBJ2 as produced by the output of the commander's sensor-fusion stage, but also the real-time images MON-OBJ1, MON-OBJ2 as produced by the output of the monitor's sensor-fusion stage. In this case the safety envelope constructed by the monitor MON may consist, for example, of the complete free space within the monitor's boundaries MON-BND, excluding the real-time objects MON-OBJ1, MON-OBJ2.

As depicted in this example, a first real-time object MON-OBJ1 generated by the monitor surrounds a first real-time object COM-OBJ1 generated by the commander entirely, while a second real-time object MON-OBJ2 generated by the monitor partially overlaps with a second real-time object COM-OBJ2 generated by the commander.

According to the current state-of-the-art the commander COM does not use information regarding the monitor's MON safety envelope when calculating a trajectory COM-TRJ1. Thus, it may happen, as depicted, that a trajectory COM-TRJ1 intersects a real-time object MON-OBJ1 generated by the monitor MON. Consequently, the trajectory verification stage TRJ-VRFY, which according to the depicted example is located in the monitor MON, but as described above could also be located in the decide subsystem DECIDE, would verify the trajectory COM-TRJ1 calculated by the monitor to not be (completely) inside the safety envelope SEMON of the monitor, thereby generating a false negative.

Figure 7:
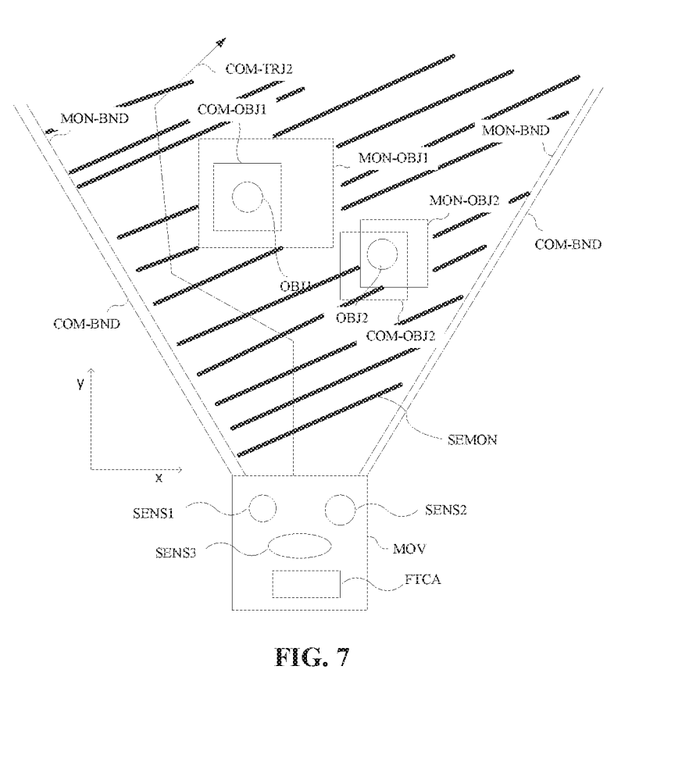

FIG. 7 depicts a scenario similar to FIG. 4. Again, the commander COM and the monitor MON perceive the objects OBJ1 and OBJ2 slightly different, i.e. commander COM produces real-time images COM-OBJ1, COM-OBJ2, while monitor MON produces real-time images MON-OBJ1, MON-OBJ2. However, in this scenario commander COM produces as an output of the trajectory planning stage TRJ-PLN stage a trajectory COM-TRJ2 that does not intersect with the real-time object MON-OBJ1 produced by the monitor MON nor with the real-time MON-OBJ2 produced by the monitor MON and, consequently, will be qualified to be inside the safety envelope SEMON calculated by the monitor MON in the trajectory verification stage TRJ-VRFY. Thus, it is ensured with a high probability that the commander COM systematically generates such trajectories and the occurrence of false negatives becomes insignificant.

Figure 8:
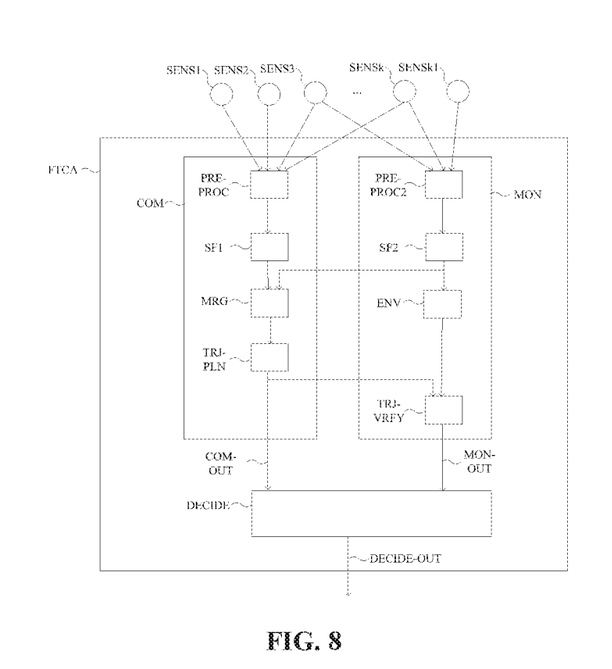

FIG. 8 depicts an example of a fail-safe trajectory planning with false-negative reduction. Sensors SENS1, . . . , SENS3, SENSk, SENSk1 sense the environment and provide their sensor reads to the at least two subsystems commander COM and monitor MON. Commander COM implements a (optional) pre-process stage PRE-PROC, a sensor fusion stage SF1, and a trajectory planning stage TRJ-PLN as described under FIG. 2. Monitor MON implements a (optional) pre-process stage PRE-PROC2, an sensor fusion stage SF2, a safe envelope generation stage ENV, and a trajectory verification stage TRJ-VRFY as described under FIG. 5. In addition, the commander COM implements an information merging stage MRG. The information merging stage MRG takes as an input the output of the commander's sensor fusion stage SF1 stage as well as output of the sensor fusion stage SF2 of the monitor MON, or at least parts of these outputs. The information merging stage MRG combines said two outputs of the sensor fusion stages SF1, SF2 (or respective parts of them) and provides a combination of said two outputs (or respective parts of them) as an input to the trajectory planning stage TRJ-PLN stage.

Figure 9:
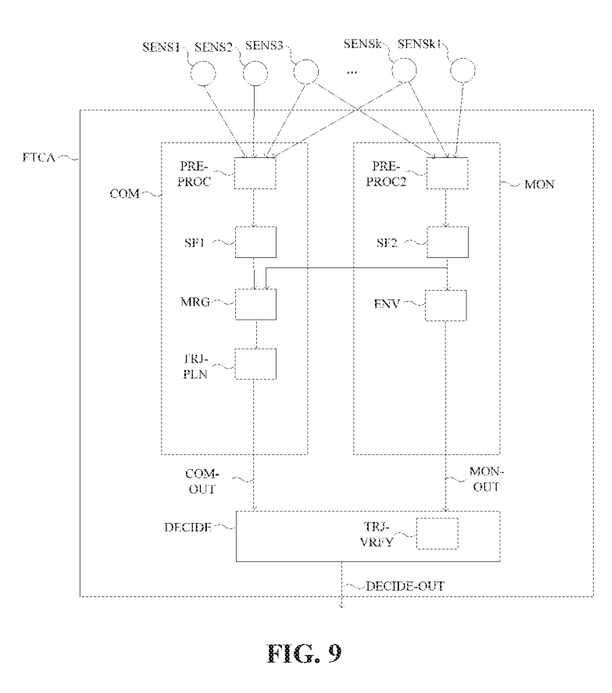

FIG. 9 depicts an analogous structure to FIG. 8 with the difference that here the decide subsystem DECIDE implements the trajectory verification stage TRJ-VRFY.

Figure 10:
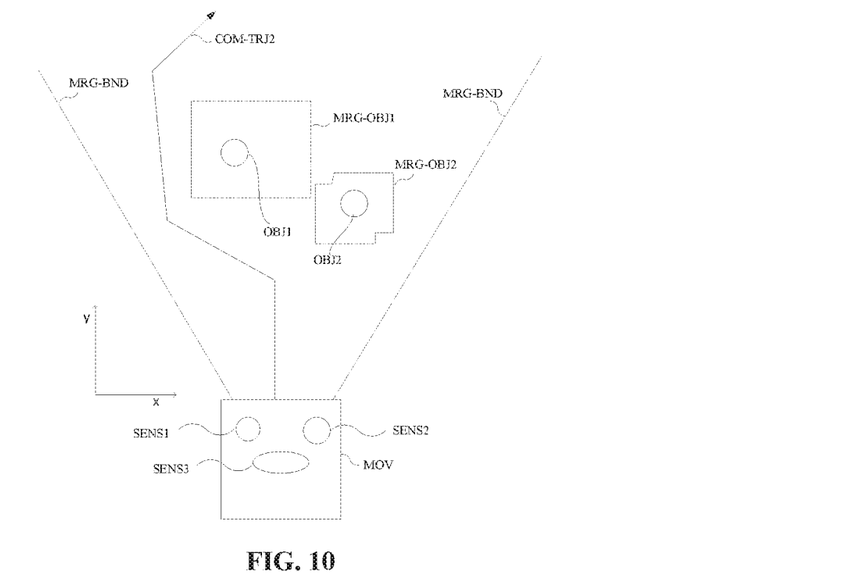

FIG. 10 depicts an example output of the information merging stage MRG of the commander COM based on the scenario described in FIG. 7. The information merging stage MRG combines the outputs from the sensor fusion stages SF1, SF2, i.e., the real-time images or parts of said real-time images COM-OBJ1, COM-OBJ2, MON-OBJ1, MON-OBJ2 using a set-theoretic superset to produce merging objects MRG-OBJ1, MRG-OBJ2 as output. In an example implementation real-time objects COM-OBJ1, COM-OBJ2, MON-OBJ1, MON-OBJ2 may be described as geometric shapes, for example as two dimensional areas (with a specific location), and the sensor fusion stages SF1, SF2 may provide the information of said geometric shapes and their relative position to the moving entity MOV in form of coordinates. Likewise, merging objects MRG-OBJ1, MRG-OBJ2 may be described as geometric shapes and the information merging stage MRG may provide the information of said geometric shapes and their relative position to the moving entity MOV in form of coordinates. According to the example shown, where the real-time objects are represented by two dimensional areas, the first merging object MRG-OBJ1 of the first object OBJ1 is an area corresponding to the total area covered by the first real-time object COM-OBJ1 of the commander COM and the first real-time object MON-OBJ1 of the monitor MON. The second merging object MRG-OBJ2 of the second object OBJ2 is an area corresponding to the total area covered by the second real-time object COM-OBJ2 of the commander COM and second first real-time object MON-OBJ2 of the monitor MON. In the specific example shown, the first merging object MRG-OBJ1 corresponds to the first real-time object MON-OBJ1 of the monitor MON, since the first real-time object COM-OBJ1 of the commander is located completely inside the first real-time object MON-OBJ1 of the monitor MON.

For simplicity of the description, we further discuss the invention based on the concept of real-time images COM-OBJ1, COM-OBJ2, MON-OBJ1, MON-OBJ2 without restricting the general applicability. For example, sensor-fusion systems may provide object fusion, grid fusion, map fusion and other output. The presented concepts in this invention also apply to these types of outputs as they also can be seen as part of the real-time images COM-OBJ1, COM-OBJ2, MON-OBJ1, MON-OBJ2 and/or real-time images COM-OBJ1, COM-OBJ2, MON-OBJ1, MON-OBJ2 can conceptually be derived by said types of outputs. For example, in another example realization sensor fusion stages SF1, SF2 may provide information of the (estimated) free space (space they do not see occupied by real-time objects COM-OBJ1, COM-OBJ2, MON-OBJ1, MON-OBJ2) as input to the information merging stage MRG. The information merging stage MRG could then apply the set-theoretic cut-set to said input information to combine the inputs.

The above statement, that the description of the invention based on the concept of real-time images is technically the same as the description based on the concept of "free space" is not only valid in context of the description, but is valid within the full scope of the invention.

A key element of the invention is that the operations of the information merging stage MRG are safe. That means even in the failure case of the monitor MON providing a faulty safety envelope to the commander COM, the information merging stage MRG operation will not cause the trajectory planning stage TRJ-PLN of the commander subsystem COM to produce an unsafe trajectory. Two examples of such safe operations of the information merging stage MRG have been described above as the set-theoretic super-set and set-theoretic cut-set, but other safe operations in the spirit of said set-theoretic operations are applicable as well.

The term "set-theoretic superset" means that the information merging stage MRG combines the real-time images COM_OBJ1, MON_OBJ1 or parts of said real-time images of a respective object OBJ1 and combines the real-time images COM_OBJ2, MON_OBJ2 or parts of said real-time images of another object OBJ2 in such a way that the output MRG_OBJ1 of the information merging stage MRG fully contains at least the individual COM_OBJ1, MON_OBJ1 and the output MRG_OBJ2 fully contains at least the individual COM_OBJ2, MON_OBJ2.

The term "set-theoretic cutset" means that the information merging stage MRG combines the real-time images COM_OBJ1, MON_OBJ1 or parts of said real-time images of a respective object OBJ1 and combines the real-time images COM_OBJ2, MON_OBJ2 or parts of said real-time images of another object OBJ2 in such a way that the output MRG_OBJ1 of the information merging stage MRG only contains the overlapping parts of the individual real-time images COM_OBJ1, MON_OBJ1 and the output MRG_OBJ2 only contains the overlapping parts of the individual real-time images COM_OBJ2, MON_OBJ2.

Some applied sensor fusion systems associate probabilities with the objects they identify, respectively, the free space they estimate. For example the monitor's MON perception of an object MON-OBJ2 could be assigned a probability of x % (the object is being detected with a probability of x %). In such a case, i.e., if the information of the monitor MON regarding its safety envelope is of probabilistic nature, then the commander COM and the monitor MON could already define probability thresholds TRSH at design time or the monitor MON could inform the commander COM of relevant probability thresholds TRSH during runtime of the system/FCTA comprising commander COM, monitor MON and decide subsystem DECIDE, such that the commander COM can translate the probabilistic information into deterministic information. For example, commander COM could accept monitor's object perception MON-OBJ1 only if probability x>probability threshold TRSH and discard said object perception MON-OBJ1 otherwise. The analogous approach follows in case that the monitor MON provides probabilistic information regarding the free space to the commander COM.

Figure 11:
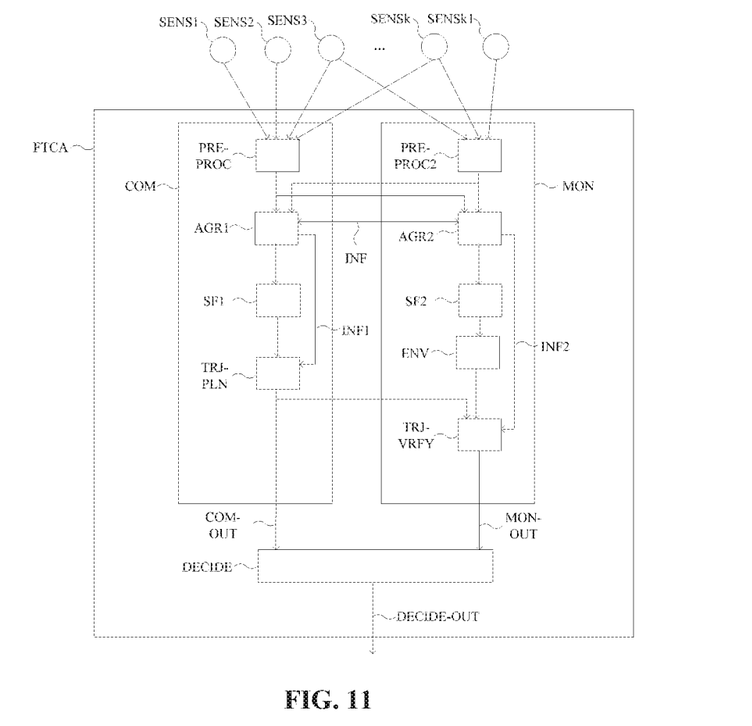

FIG. 11 depicts another example of a fail-safe trajectory planning with false-negative reduction. Sensors SENS1, . . . , SENS3, SENSk, SENSk1 sense the environment and provide their sensor reads to the at least two subsystems commander COM and monitor MON. Commander COM implements a (optional) pre-process stage PRE-PROC, a sensor fusion stage SF1, and a trajectory planning stage TRJ-PLN as described under FIG. 2. Monitor MON implements a (optional) pre-process stage PRE-PROC2, an sensor fusion stage SF2, a safe envelope generation stage ENV, and a trajectory verification stage TRJ-VRFY as described under FIG. 5. In addition, the commander COM implements an information agreement stage AGR1. Optionally, as shown, the monitor MON may also implement an information agreement stage AGR2, the so-called second information agreement stage AGR2.

The monitor MON provides first information regarding the monitor's sensor reads to the commander COM, e.g., the monitor MON sends all sensor reads and/or pre-processed data to the commander COM, or the monitor MON sends summaries of the sensor reads and/or pre-processed data, and/or combinations of the monitor's sensor reads, pre-processed sensors data, and summaries to the commander COM.

The commander COM may optionally provide second information regarding the commander's sensor reads to the monitor MON, e.g., the commander COM sends all sensor reads and/or pre-processed data to the monitor MON, or the commander COM sends summaries of the sensor reads and/or pre-processed data, and/or combinations of the commander's sensor reads, pre-processed sensors data, and summaries to the monitor MON.

For example, the information agreement stage AGR1 of the commander COM is arranged between the pre-processing stage PRE-PROC and the sensor fusion stage SF1 of the commander COM. The optional, second information agreement stage AGR2 of the monitor MON may be arranged between the pre-processing stages PRE-PROC2 and the sensor fusion stage SF2 of the monitor MON, respectively. The information agreement stage AGR1 of the commander COM receives said first information from the pre-processing stage PRE-PROC2 of the monitor MON, and optionally, if provided, the information agreement stage AGR2 of the monitor MON receives said second information from the pre-processing stage PRE-PROC of the commander COM.

If both, the commander COM and the monitor MON are comprising an information agreement stage, as shown in FIG. 11, their information agreement stages AGR1, AGR2 may exchange information, such that commander COM is aware of which sensor data the monitor MON is using. In another example realization the monitor MON can also use information to be aware of which sensor data the commander COM is using.

It may be of advantage, that commander COM and monitor MON can agree their information agreement stages AGR1, AGR2 on which sensor data to use by using an information channel INF between the information agreement stages AGR1, AGR2 for establishing such an agreement, as depicted in FIG. 11.

In addition, FIG. 11 depicts a further advantageous option, according to which option the commander COM may communicate said first information or derived information from said first information, to the trajectory planning stage TRJ-PLN on an information channel INF1 from its information agreement stage AGR1 to its trajectory planning stage TRJ-PLN. Alternatively or in addition it may be provided that the monitor MON communicates also said second information or derived information from said second information, to the trajectory verification stage TRJ-VRFY stage on an information channel INF2 between the information agreement stage AGR2 of the monitor MON and the trajectory verification stage TRJ-VRFY of the monitor.

The trajectory planning stage TRJ-PLN in the commander COM can then use information about the sensor data processed by the monitor MON and/or the agreement established between commander COM and monitor MON in the information agreement stages ARG1, ARG2 when calculating a trajectory COM-TRJ2. In one example realization the commander COM uses all or parts of said first information in the trajectory planning stage TRJ-PLN and preferably, in addition, knowledge about the specific realization ("known characteristics") of the monitor MON (e.g., algorithms deployed in the stages different stages sensor fusion SF2, safe envelope generating stage ENV, trajectory verification TRJ-VRFY) when calculating a trajectory COM-TRJ2.

Figure 12:
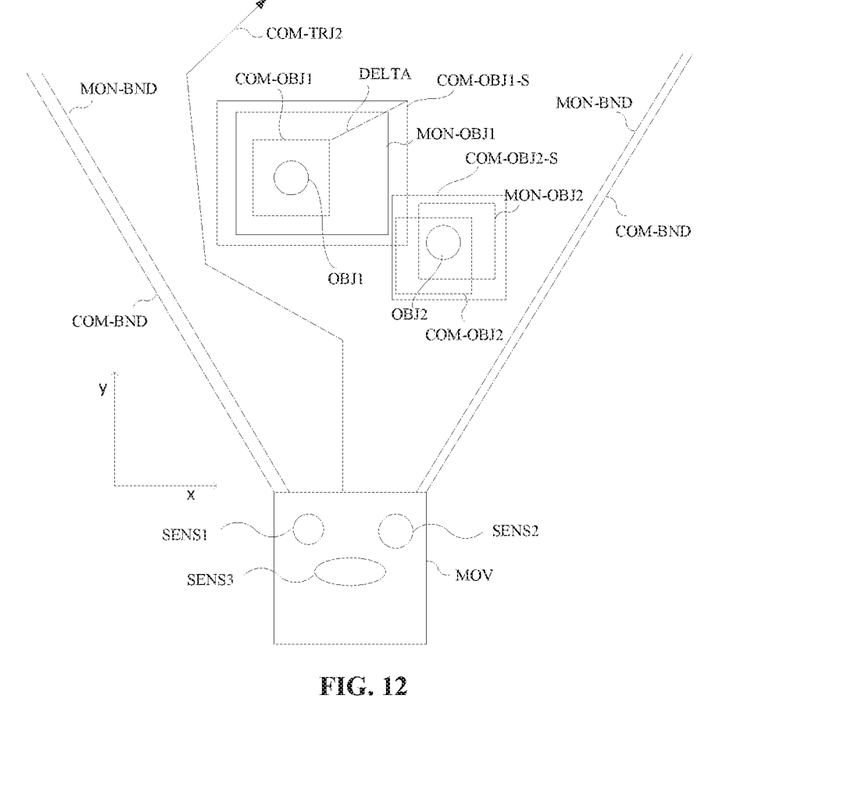

As depicted in FIG. 12, in one realization the trajectory planning stage TRJ-PLN enlarges, before calculating a trajectory COM-TRJ2, the real-time images COM-OBJ1, COM-OBJ2 provided by the sensor fusion stage SF1 by a predefined margin DELTA, resulting in real-time images COM-OBJ1-S, COM-OBJ2-S.

In another realization the trajectory planning stage TRJ-PLN enlarges the real-time images COM-OBJ1, COM-OBJ2 provided by the sensor fusion stage SF1 by a margin DELTA to real-time images COM-OBJ1-S, COM-OBJ2-S, where DELTA is calculated at run-time based on the information exchanged between the commander COM and monitor MON as described in connection with FIG. 11 before calculating a trajectory COM-TRJ2.

Figure 13:
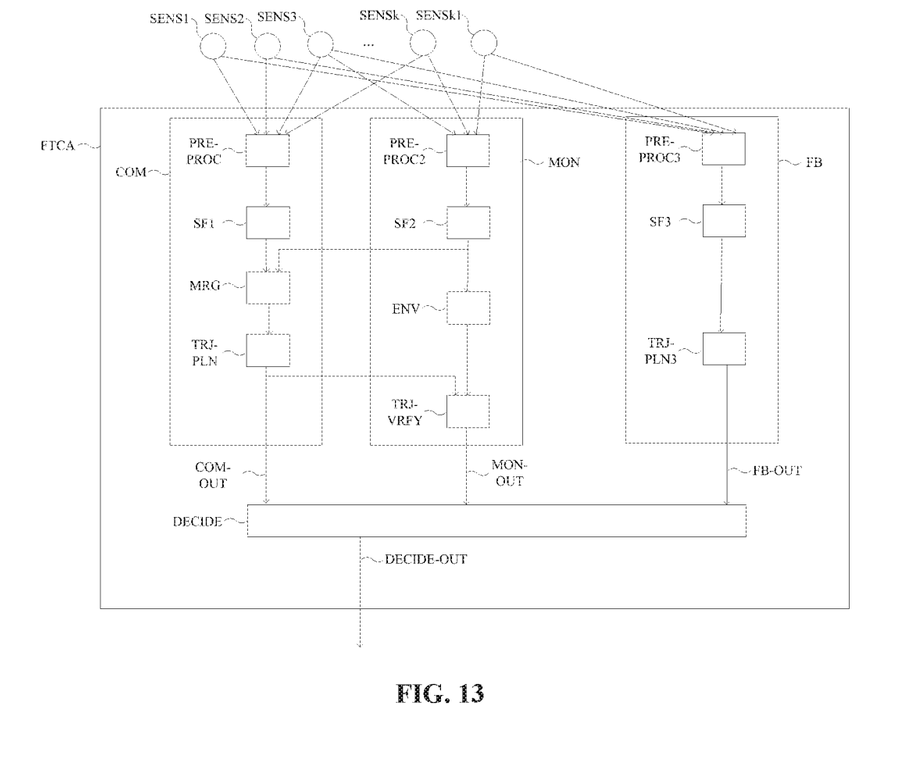

FIG. 13 depicts a fault-tolerant architecture that makes use of the fail-silent trajectory planning with low false-negatives. FIG. 13 is based on an arrangement (with all its possible options) as described in connection with FIG. 8. The architecture shown in FIG. 13 may also be based on an arrangement shown on FIG. 5, or FIG. 9 or FIG. 11, with all their possible options. Now, according to the fault tolerant architecture shown in FIG. 13, an additional fallback FB is implemented. The fall back FB implements a sensor-fusion stage SF3, a trajectory planning TRJ-PLN3, and optionally a sensor pre-processing stage PRE-PROC3. In case that decide stage DECICE receives a trajectory COM-TRJ1 from the commander COM which the monitor MON (or the decide stage DECIDE) successfully verifies not to be in the safety envelope, the decide stage DECIDE will cause the moving entity MOV to use the trajectory produced by the fall back FB rather than the trajectory produced by the commander COM. Since the probability of false negatives is low, this scenario will, with high probability, only happen in case of a true failure of either the commander COM or the monitor MON.

Figure 14:
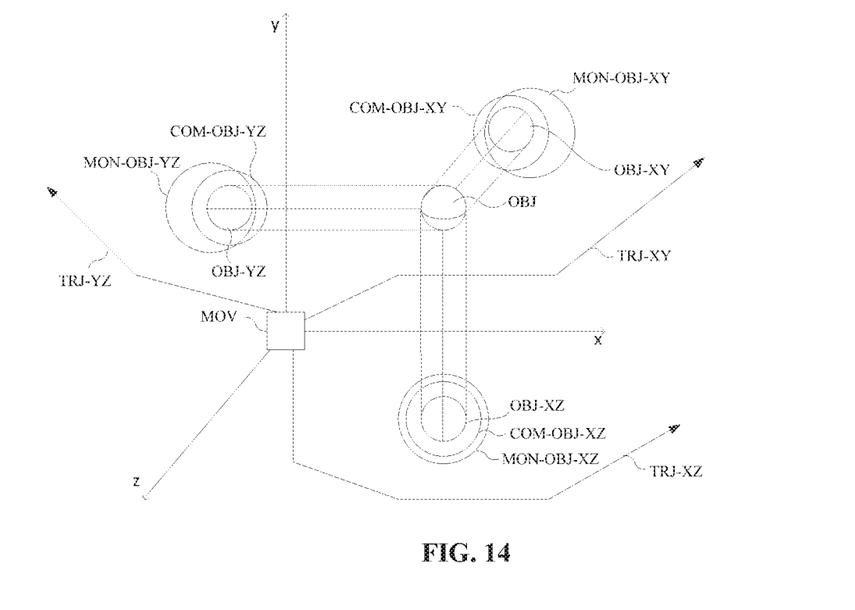

FIG. 14 depicts the trajectory planning in three dimensions as for example for a moving entity MOV in form of an unmanned aeronautical vehicle (UAV). Here, an object OBJ is projected in the three plains of the 3D space and the real-time images generated by the commander COM and the monitor MON are depicted in form of their projections (commander: real-time images COM-OBJ-XY, COM-OBJ-XZ, COM-OBJ-YZ; monitor: real-time images MON-OBJ-XY, MON-OBJ-XZ, MON-OBJ-YZ). The proposed method for fail-safe trajectory planning with low probability of false negatives as described above analogously applies in this setting by its execution on the projections in these plains.

Figure 15:
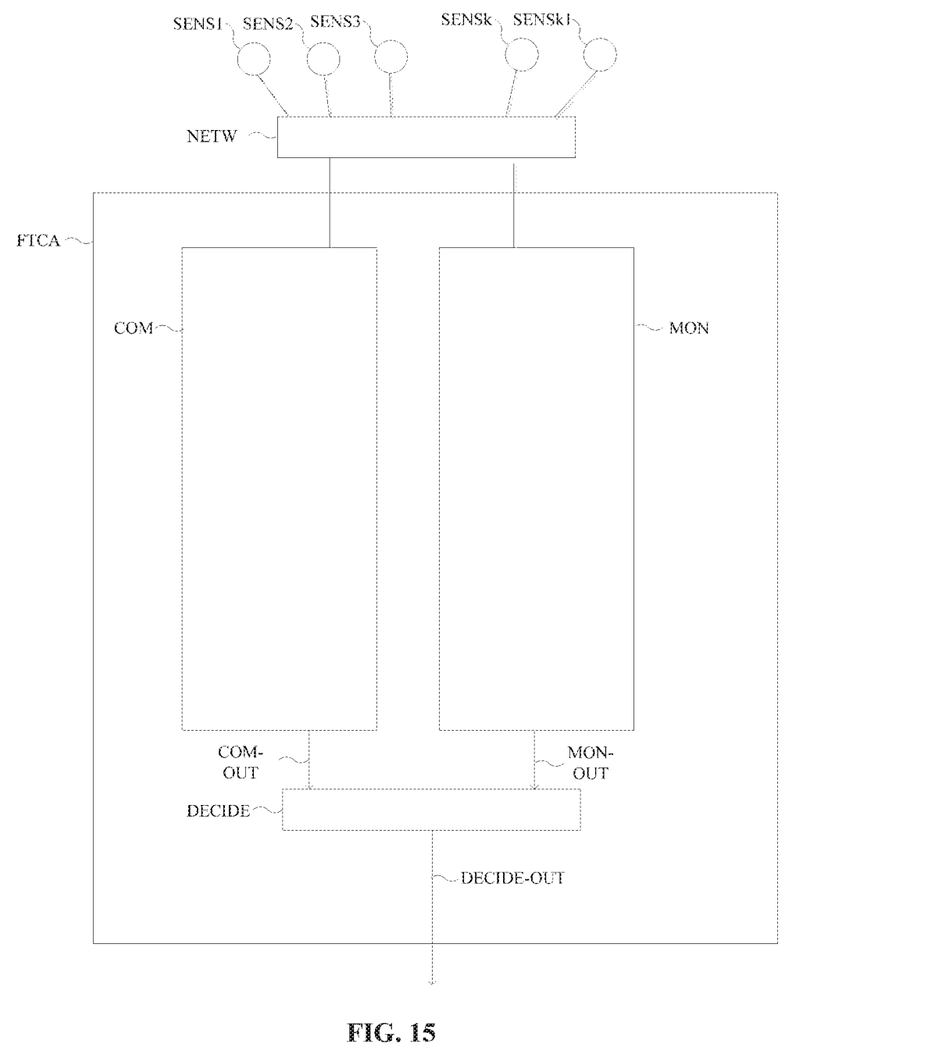

FIG. 15 depicts another example of a fail-safe trajectory planning with false-negative reduction. Here, the sensors SENS1-SENS3, SENSk, SENSk1 are not directly connected to the commander COM and the monitor MON subsystems, but are connected indirectly via a network NETW. In general, arbitrary sets of sensors may connect either directly to a subsystem or via a network. An arrangement as shown in FIG. 15 may be provided in all examples as shown in FIG. 5, 8, 9, 11, or 13 instead of a direct connection of the sensors to the commander COM, monitor MON and (in the arrangement of FIG. 13) to the fall back FB.

The invention claimed is:

1. A method implemented by one or more computers for reducing false negatives in fail-safe trajectory planning for a moving entity (MOV), where the method uses at least three subsystems (COM, MON, DECIDE), wherein a first of said at least three subsystems comprises a commander (COM), which implements at least a first sensor fusion stage (SF1) and a trajectory planning stage (TRJ-PLN), wherein a second of said at least three subsystems comprises a monitor (MON), which implements at least a second sensor fusion stage (SF2) and a safe envelope generating stage (ENV), wherein sensors (SENS1-SENS3, SENSk, SENSk1) monitor a surrounding of the moving entity (MOV), wherein said first and second sensor fusion stages (SF1, SF2) accept raw and/or preprocessed sensor data from the sensors (SENS1-SENS3, SENSk, SENSk1) as input, wherein based on said input, the first and second sensor fusion stages (SF1, SF2) produce as output real-time images (COM-OBJ1, COM-OBJ2, MON-OBJ1, MON-OBJ2) of objects (OBJ1, OBJ2) detected by the sensors, wherein the trajectory planning stage (TRJ-PLN) of the commander (COM) generates one or more trajectories (COM-TRJ1, COM-TRJ2) based at least on the output of the first sensor fusion stage (SF1) of the commander (COM), wherein said safe envelope generating stage (ENV) of the monitor (MON) generates a safety envelope based at least on the output of the second sensor fusion stage (SF2) of the monitor (MON), wherein a trajectory verification stage (TRJ-VRFY) of the monitor (MON) and/or a trajectory verification stage (TRJ-VRFY) of a decision subsystem (DECIDE) verifies a trajectory of the one or more trajectories (COM-TRJ1, COM-TRJ2) generated by the commander (COM) if and only if said trajectory (COM-TRJ1, COM-TRJ2) is completely located inside said safety envelope generated by the safe envelope generating stage (ENV) of the monitor (MON), and wherein the moving entity (MOV) uses the trajectory (COM-TRJ1, COM-TRJ2) generated by the commander (COM) only when said trajectory is verified by the monitor (MON) and/or by the decision subsystem (DECIDE), the method comprising:

implementing, by the commander (COM), an information merging stage (MRG) that takes as information at least parts of the output (COM-OBJ1, COM-OBJ2) of the first sensor fusion stage (SF1) of the commander (COM) and at least parts of the output (MON-OBJ1, MON-OBJ2) of the second sensor fusion stage (SF2) of the monitor (MON) and combines said information to generate merged output (MRG-OBJ1, MRG-OBJ2), wherein the trajectory planning stage (TRJ-PLN) of the commander (COM) uses said generated merged output (MRG-OBJ1, MRG-OBJ2) of said information merging stage (MRG) when generating the one or more trajectories (COM-TRJ1, COM-TRJ2), wherein the information merging stage (MRG) uses a set-theoretic superset operation to combine the outputs (COM-OBJ1, COM-OBJ2, MON-OBJ1, MON-OBJ2) from the first and second sensor fusion stages (SF1, SF2) to produce the merged output (MRG-OBJ1, MRG-OBJ2), or wherein in a case that the first and second sensor fusion stages (SF1, SF2) produce a free space as output, the information merging stage (MRG) uses a set-theoretic cut-set operation to combine the outputs (COM-OBJ1, COM-OBJ2, MON-OBJ1, MON-OBJ2) from the first and second sensor fusion stages (SF1, SF2), or implementing, by the commander (COM), an information agreement stage comprising a first information agreement stage (AGR1), wherein said first information agreement stage (AGR1) takes as information at least parts of the raw and/or preprocessed sensor data from the sensors (SENS1-SENS3, SENSk, SENSk1) and in addition takes information indicating which raw and/or preprocessed sensor data the monitor accepts from the sensors (SENS1-SENS3, SENSk, SENSk1) as input in its second sensor fusion stage (SF2) based on which input the commander (COM) and the monitor (MON) produce as the output real-time images, wherein said first information agreement stage (ARG1) provides at least parts of the raw and/or preprocessed sensor data from the sensors (SENS1-SENS3, SENSk, SENSk1) and in addition takes information indicating which sensor data the monitor (MON) will use in its second sensor fusion stage (SF2) to the trajectory planning stage (TRJ-PLN), wherein said trajectory planning stage (TRJ-PLN) uses said information from said first information agreement stage (ARG1) to add safety margins around the real-time images (COM-OBJ1, COM-OBJ2) provided from the first sensor fusion stage (SF1) of the commander (COM), and wherein said trajectory planning stage (TRJ-PLN) produces the one or more trajectories (COM-TRJ1, COM-TRJ2) that do not intersect with the real-time images (COM-OBJ1, COM-OBJ2) produced by the first sensor fusion stage (SF1) of the commander (COM) or with said safety margins around them; and causing the moving entity, by the one or more computers and based on the trajectory being qualified as safe, to autonomously maneuver along the trajectory.

2. The method according to claim 1, wherein the monitor (MON) implements an information agreement stage comprising a second information agreement stage (ARG2).

3. The method according to claim 2, wherein the information indicating which sensor data the monitor (MON) will use in its second sensor fusion stage (SF2) is provided by the second information agreement stage (ARG2).

4. The method according to claim 1, wherein the trajectory planning stage (TRJ-PLN) uses information associated with the second sensor fusion state (SF2) and the safe envelope generating stage (ENV), and wherein the trajectory verification stage (TRJ-VRFY) of the monitor (MON) adds safety margins around the real-time images (COM-OBJ1, COM-OBJ2) provided from the first sensor fusion stage (SF1) of the commander (COM).

5. The method according to claim 1, wherein known characteristics of the monitor (MON) are associated with the second sensor fusion stage (SF2), the safe envelope generating stage (ENV), and/or the trajectory verification stage (TRJ-VRFY).

6. The method according to claim 1, wherein a fallback subsystem (FB) is provided, wherein said fallback subsystem implements at least a third sensor fusion stage (SF3) and additional trajectory planning stage (TRJ-PLN3), so that the fallback subsystem (FB) is capable of generating trajectories, and wherein when the trajectory (COM-TRJ1, COM-TRJ2) generated by the commander (COM) is not verified by the decision subsystem (DECIDE), a trajectory or trajectories produced by the fallback subsystem (FB) are provided for being used by the moving entity (MOV).

7. A fault-tolerant computer system (FCTA) for fail-safe trajectory planning for a moving entity (MOV), wherein the computer system comprises at least three subsystems (COM, MON, DECIDE), wherein a first of said at least three subsystems comprise a commander (COM), which implements at least a first sensor fusion stage (SF1) and a trajectory planning stage (TRJ-PLN), and wherein a second of said at least three subsystems comprises a monitor (MON), which implements at least a second sensor fusion stage (SF2) and a safe envelope generating stage (ENV), wherein said first and second sensor fusion stages (SF1, SF2) are configured to accept as input raw and/or preprocessed sensor data from sensors (SENS1-SENS3, SENSk, SENSk1), which are configured to monitor a surrounding of the moving entity (MOV), wherein based on said input, the first and second sensor fusion stages (SF1, SF2) are configured to produce as output real-time images (COM-OBJ1, COM-OBJ2, MON-OBJ1, MON-OBJ2) of objects (OBJ1, OBJ2) detected by the sensors, wherein the trajectory planning stage (TRJ-PLN) of the commander (COM) is configured to generate one or more trajectories (COM-TRJ1, COM-TRJ2) based at least on the output of the first sensor fusion stage (SF1) of the commander (COM), wherein said safe envelope generating stage (ENV) of said monitor (MON) is configured to generate a safety envelope based at least on the output of the second sensor fusion stage (SF2) of the monitor (MON), wherein a trajectory verification stage (TRJ-VRFY) of the monitor (MON) and/or a trajectory verification stage (TRJ-VRFY) of a decision subsystem (DECIDE) is configured to verify a trajectory of the one or more trajectories (COM-TRJ1, COM-TRJ2) generated by the commander (COM) if and only if said trajectory (COM-TRJ1, COM-TRJ2) is completely located inside said safety envelope generated by the safe envelope generating stage (ENV) of the monitor (MON), and wherein the moving entity (MOV) uses the trajectory (COM-TRJ1, COM-TRJ2) generated by the commander (COM) only when said trajectory is verified by the monitor (MON) and/or by the decision subsystem (DECIDE), wherein for implementing the fail-safe trajectory planning, the fault-tolerant computer system comprises:

an information merging stage (MRG) implemented by the commander, wherein the information merging stage is configured to take as information at least parts of the output (COM-OBJ1, COM-OBJ2) of the first sensor fusion stage (SF1) of the commander (COM) and at least parts of the output (MON-OBJ1, MON-OBJ2) of the second sensor fusion stage (SF2) of the monitor (MON) and combines said information to generate merged output (MRG-OBJ1, MRG-OBJ2), wherein the trajectory planning stage (TRJ-PLN) of the commander (COM) uses said generated merged output (MRG-OBJ1, MRG-OBJ2) of said information merging stage (MRG) when generating the one or more trajectories (COM-TRJ1, COM-TRJ2), wherein the information merging stage (MRG) uses a set-theoretic superset operation to combine the outputs (COM-OBJ1, COM-OBJ2, MON-OBJ1, MON-OBJ2) from the first and second sensor fusion stages (SF1, SF2) to produce the merged output (MRG-OBJ1, MRG-OBJ2), or wherein in a case that the first and second sensor fusion stages (SF1, SF2) produce a free space as output, the information merging stage (MRG) uses a set-theoretic cut-set operation to combine the outputs (COM-OBJ1, COM-OBJ2, MON-OBJ1, MON-OBJ2) from the first and second sensor fusion stages (SF1, SF2), or an information agreement stage implemented by the commander, wherein the information agreement stage comprises a first information agreement stage (AGR1), wherein said first information agreement stage (AGR1) is configured to take as information at least parts of the raw and/or preprocessed sensor data from the sensors (SENS1-SENS3, SENSk, SENSk1) and in addition is configured to take information indicating which raw and/or preprocessed sensor data the monitor accepts from the sensors (SENS1-SENS3, SENSk, SENSk1) as input in its second sensor fusion stage (SF2) based on which input the commander (COM) and the monitor (MON) produce as the output real-time images, wherein said first information agreement stage (ARG1) provides at least parts of the raw and/or preprocessed sensor data from the sensors (SENS1-SENS3, SENSk, SENSk1) and in addition takes information indicating which sensor data the monitor (MON) will use in its second sensor fusion stage (SF2) to the trajectory planning stage (TRJ-PLN), and wherein said trajectory planning stage (TRJ-PLN) uses said information from said first information agreement stage (ARG1) to add safety margins around the real-time images (COM- OBJ1, COM-OBJ2) provided from the first sensor fusion stage (SF1) of the commander (COM), and wherein said trajectory planning stage (TRJ-PLN) is configured to produce the one or more trajectories (COM-TRJ1, COM-TRJ2) that do not intersect with the real-time images (COM-OBJ1, COM-OBJ2) produced by the first sensor fusion stage (SF1) of the commander (COM) or with said safety margins around them, wherein the computer system causes the moving entity, based on the trajectory being qualified as safe, to autonomously maneuver along the trajectory.

8. The system according to claim 7, wherein the monitor (MON) implements an information agreement stage comprising a second information agreement stage (ARG2).

9. The system according to claim 8, wherein the information indicating which sensor data the monitor (MON) will use in its second sensor fusion stage (SF2) is provided by the second information agreement stage (ARG2).

10. The system according to claim 7, wherein the trajectory planning stage (TRJ-PLN) uses information associated with the second sensor fusion (SF2), the safe envelope generating stage (ENV), and the trajectory verification stage (TRJ-VRFY) of the monitor (MON) to add safety margins around the real-time images (COM-OBJ1, COM-OBJ2) provided from the first sensor fusion stage (SF1) of the commander (COM).

11. The system according to claim 7, wherein known characteristics of the monitor (MON) are associated with the second sensor fusion stage (SF2), the safe envelope generating stage (ENV), and/or the trajectory verification stage (TRJ-VRFY).

12. The system according to claim 7, wherein the fault-tolerant computer system (FTCA) implements a fallback subsystem (FB), wherein said fallback subsystem implements at least a third sensor fusion stage (SF3) and additional trajectory planning stage (TRJ-PLN3), so that the fallback subsystem (FB) is capable of generating trajectories, and wherein when the trajectory (COM-TRJ1, COM-TRJ2) generated by the commander (COM) is not verified by the decision subsystem (DECIDE), the trajectories produced by the fallback subsystem (FB) are provided for being used by the moving entity (MOV).

13. A method implemented by one or more computers for reducing false negatives in fail-safe trajectory planning for a moving entity, wherein the method uses at least three subsystems,
wherein a first of said at least three subsystems comprises a commander, which implements at least a first sensor fusion stage and a trajectory planning stage,
wherein a second of said at least three subsystems comprises a monitor, which implements at least a second sensor fusion stage and a safe envelope generating stage,
wherein sensors monitor a surrounding of the moving entity,
wherein said first and second sensor fusion stages accept raw and/or preprocessed sensor data from the sensors as an input, wherein based on said input, the first and second sensor fusion stages produce as an output real-time images of objects detected by the sensors,
wherein the trajectory planning stage of the commander generates one or more trajectories based at least on the output of the first sensor fusion stage of the commander,
wherein said safe envelope generating stage of the monitor generates a safety envelope based at least on the output of the second sensor fusion stage of the monitor,
wherein a trajectory verification stage of the monitor and/or a trajectory verification stage of a decision subsystem verifies a trajectory of the one or more trajectories by the commander if and only if said trajectory is completely located inside said safety envelope generated by the safe envelope generating stage of the monitor, and
wherein the moving entity uses the trajectory generated by the commander only when said trajectory is verified by the monitor and/or by the decision subsystem, the method comprising:
implementing, by the commander, an information agreement stage comprising a first information agreement stage,
wherein said first information agreement stage takes as information at least parts of the raw and/or preprocessed sensor data from the sensors and in addition takes information indicating which raw and/or preprocessed sensor data the monitor accepts from the sensors as input in its second sensor fusion stage based on which input the commander and the monitor produce as the output real-time images,
wherein said first information agreement stage provides at least parts of the raw and/or preprocessed sensor data from the sensors and in addition takes information indicating which sensor data the monitor will use in its second sensor fusion stage to the trajectory planning stage,
wherein said trajectory planning stage uses said information from said first information agreement stage to add safety margins around the real-time images provided from the first sensor fusion stage of the commander, and wherein said trajectory planning stage produces the one or more trajectories that do not intersect with the real-time images produced by the first sensor fusion stage of the commander or with said safety margins around them; and
causing the moving entity, by one or more computers and based on the trajectory being qualified as safe, to autonomously maneuver along the trajectory.

* * * * *